United States Patent
Su et al.

(10) Patent No.: US 8,867,596 B2
(45) Date of Patent: Oct. 21, 2014

(54) METHODS AND APPARATUSES OF CALIBRATING I/Q MISMATCH IN COMMUNICATION CIRCUIT

(75) Inventors: Chin Su, Kaohsiung (TW); Hong-Ta Hsu, Hsinchu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 228 days.

(21) Appl. No.: 13/398,862

(22) Filed: Feb. 17, 2012

(65) Prior Publication Data

US 2012/0213266 A1  Aug. 23, 2012

(30) Foreign Application Priority Data

Feb. 17, 2011 (TW) ............... 100105217 A

(51) Int. Cl.
H04B 3/46 (2006.01)
H04B 17/00 (2006.01)
H04Q 1/20 (2006.01)

(52) U.S. Cl.
CPC ........ H04B 17/0062 (2013.01); H04B 17/0085 (2013.01)

USPC .......................................... 375/226; 375/295

(58) Field of Classification Search
USPC .................................. 375/295, 226
See application file for complete search history.

(56) References Cited

U.S. PATENT DOCUMENTS

| 2002/0015450 A1 | 2/2002 | Ratto |
| 2007/0058754 A1 | 3/2007 | Lin |
| 2009/0154595 A1* | 6/2009 | Choksi et al. ............. 375/295 |

FOREIGN PATENT DOCUMENTS

| CN | 101904145 A | 12/2010 |
| TW | 200616371 | 5/2006 |

* cited by examiner

Primary Examiner — Tanmay Shah
(74) Attorney, Agent, or Firm — Winston Hsu; Scott Margo

(57) ABSTRACT

A method and apparatus of calibrating I/Q mismatch of a communication circuit is disclosed. The disclosure employs I/Q test signals respectively including different frequency components to calibrate the frequency-dependent I/Q mismatch existing in the communication system.

22 Claims, 10 Drawing Sheets

METHODS AND APPARATUSES OF CALIBRATING I/Q MISMATCH IN COMMUNICATION CIRCUIT

BACKGROUND

1. Technical Field

The disclosure relates generally to wireless communication.

2. Description of Related Art

In wireless communication, a communication circuit, such as a receiver or a transmitter, is employed for modulating information to be transmitted, and transmitting the modulated information via an antenna or demodulating a signal received via the antenna, and extracting the information carried by the demodulated signal. A conventional transmitter can be implemented with various architectures, one of which is direct up-conversion transmitter. A simplified block diagram of the direct-up transmitter is illustrated in FIG. 1. As illustrated in FIG. 1, the direct-up transmitter 100 comprises an in-phase branch (I-branch) 110 and a quadrature-phase branch (Q-branch) 120, which respectively comprise digital-to-analog converters (DAC) 111 and 121, low-pass filters (LPF) 112 and 122, mixers 113 and 123, an adder 130, a power amplifier (PA) 140 and an antenna 150. In the I-branch 110, a digital baseband in-phase signal BBIt will be inputted to the DAC 111 for conversion, and then be inputted to the LPF 112 for filtering. Subsequently, it is mixed with a local in-phase oscillation signal LOIt by the mixer 113, so as to generate an in-phase analog radio frequency AnIt. In the Q-branch 120, a digital baseband quadrature-phase signal BBIt is also processed in a similar manner, and is subsequently mixed with a quadrature-phase local oscillating signal LOQt by the mixer 123 to generate a quadrature-phase analog radio frequency AnQt. Accordingly, with the adder 130, in-phase analog radio frequency AnIt and the quadrature-phase analog radio frequency AnQt will be summed up. The summed signal will be amplified by the power amplifier 140 and transmitted out through antenna 150.

The direct-conversion transmitter has inherent advantages in low cost, small package size and low power consumption such that it is widely used in a variety of wireless communication devices. The tradeoff is a higher degree of radio frequency imperfection, especially, in-phase (I) and quadrature (Q) mismatch in the analog front-end, which means the amplitude, phase, or path (i.e., delay time) mismatches between the I-branch signal and Q-branch signal. For example, in single-carrier modulation system, the amplitude mismatch between I-branch and Q-branch signal results in a visible distortion in the constellation—the square constellation of a 64-QAM signal would become rectangular. Besides, the I/Q mismatch introduces unwanted image interference and severely limits the achievable SNR in the system, which results in loss of information and degrades error vector magnitude (EVM) or bit error rate (BER).

U.S. application Publication NO. 20020015450 discloses a method and an arrangement for determining correction parameters used to calibrate the phase and amplitude mismatch of an I/Q modulator in a transmitter. The transmitter includes an I/Q modulator and a corrector for correcting amplitude and phase mismatch caused by the I/Q modulator. The arrangement has means for sampling the I/Q modulated test signal to be transmitted, means for A/D converting the signal samples taken from the test signal, means for I/Q demodulating the signal samples digitally into I/Q feedback signals, and means for determining the correction parameters of phase and amplitude on the basis of the determined phase and amplitude mismatch.

Another related art of transmitter mismatch correction scheme utilizes an envelope detector and circuitry to detect the output of the transmitter and to amplify detected envelopes. For sinusoidal I/Q inputs at BB_I and BB_Q, the high-frequency envelope detector generates a filtered and amplified baseband ripple with spectral components at $F_{BB}$ due to LOFT and at $2 \times F_{BB}$ due to I/Q mismatch. The phase and amplitude information can then be used to pre-distort the modulated signal.

These related arts only consider and calibrate the amplitude and phase mismatches, and these mismatches due to the mixers (e.g. 113 and 123) and the local oscillating signals (e.g. LOIt and LOQt) are generally frequency-independent. However, in reality, even though the amplitude and phase mismatches are well-calibrated, the communication circuit 100 still has RF imperfection. This is because frequency-dependent mismatches are not taken into consideration. Therefore, in wide-band applications, problems due to the I/Q mismatch of the communication circuit 100 will appear again. Such frequency-dependent mismatches exist because there are delay time mismatches caused by differences between component characteristics of the DACs 111 and 121, LPFs 112 and 122.

BRIEF SUMMARY

The disclosure avoids the imperfection due to the frequency-dependent I/Q mismatch. In an exemplary embodiment, a test signal having components corresponding to at least one frequency is utilized for calibration.

In an exemplary embodiment, a method of calibrating in-phase and quadrature-phase mismatch between an in-phase signal and a quadrature-phase signal of a communication circuit is disclosed. The method includes: providing a first test signal and a second test signal having components corresponding to a first frequency, wherein one of the first and the second test signals is an in-phase signal and the other is a quadrature-phase signal; calibrating the first test signal according to a current first calibration parameter to generate an adjusted first test signal, wherein the current first calibration parameter corresponds to delay time; and performing a first calibration parameter adjustment operation. The step of performing the first calibration parameter adjustment operation comprises: providing a first summation signal, wherein the first summation signal is generated by: mixing a first in-phase analog signal that is generated according to the adjusted first test signal with an in-phase local oscillating signal; mixing a first quadrature-phase analog signal that is generated according to the second test signal with a quadrature-phase local oscillating signal; and summing up results of mixing; and performing a self-mixing operation on the first summation signal to generate a first to-be-tested signal; and updating the current first calibration parameter according to a value of the first power corresponding to the first to-be-tested signal at a first specific frequency. In addition, when a first specific condition is met, stopping the first calibration parameter adjustment operation; otherwise, repeating the first calibration parameter adjustment operation until the first specific condition is met.

In an exemplary embodiment, an apparatus of calibrating I/Q mismatch in a communication circuit is disclosed. The apparatus provides a first test signal and a second test signal having components corresponding to a first frequency to the communication circuit, wherein one of the first test signal and the second test signal is an in-phase signal and the other is a quadrature-phase signal, the apparatus comprising. The apparatus includes: a calibration unit, a detection unit and a calibration parameter adjustment unit. The calibration unit is employed for respectively receiving the first test signal and the second test signal, and calibrating the first test signal according to a current first calibration parameter to generate an adjusted first test signal, wherein the current first calibration parameter corresponds to delay time. The detection unit is employed for performing a self-mixing operation on a first summation signal to generate a first to-be-tested signal, and calculating a value of a first power corresponding to the first to-be-tested signal at a first specific frequency, wherein the communication circuit generates a first in-phase analog signal according to the adjusted first test signal, and generates a first quadrature-phase analog signal according to the second test signal, a mixer mixes the first in-phase analog signal with an in-phase local oscillating signal, and mixes the first quadrature-phase analog signal according to the second test signal with a quadrature-phase local oscillating signal, and an adder sums results of mixing to generate the first summation signal. The calibration parameter adjustment unit is coupled to the calibration unit and the detection unit, and employed for performing a first calibration parameter adjustment operation to update the current first calibration parameter according to the value of the first power, wherein the calibration parameter adjustment unit stops the first calibration parameter adjustment operation when a first specific condition is met; otherwise, the calibration parameter adjustment unit repeats the first calibration parameter adjustment operation.

These and other objectives of the disclosure will no doubt become obvious to those of ordinary skill in the art after reading the following detailed description of the embodiment that is illustrated in the various figures and drawings.

DETAILED DESCRIPTION

Certain terms are used throughout component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

In the following specification, the invention will be described with reference to specific exemplary embodiments thereof. However, the specification and drawings are to be regarded in an illustrative sense rather than a restrictive sense. In addition, reference in the specification to "one embodiment" means that a particular feature, structure, or characteristic described in connection with the embodiment is included in at least an implementation. The appearances of the phrase "in one embodiment" in various places in the specification are not necessarily all referring to the same embodiment.

Figure 1:
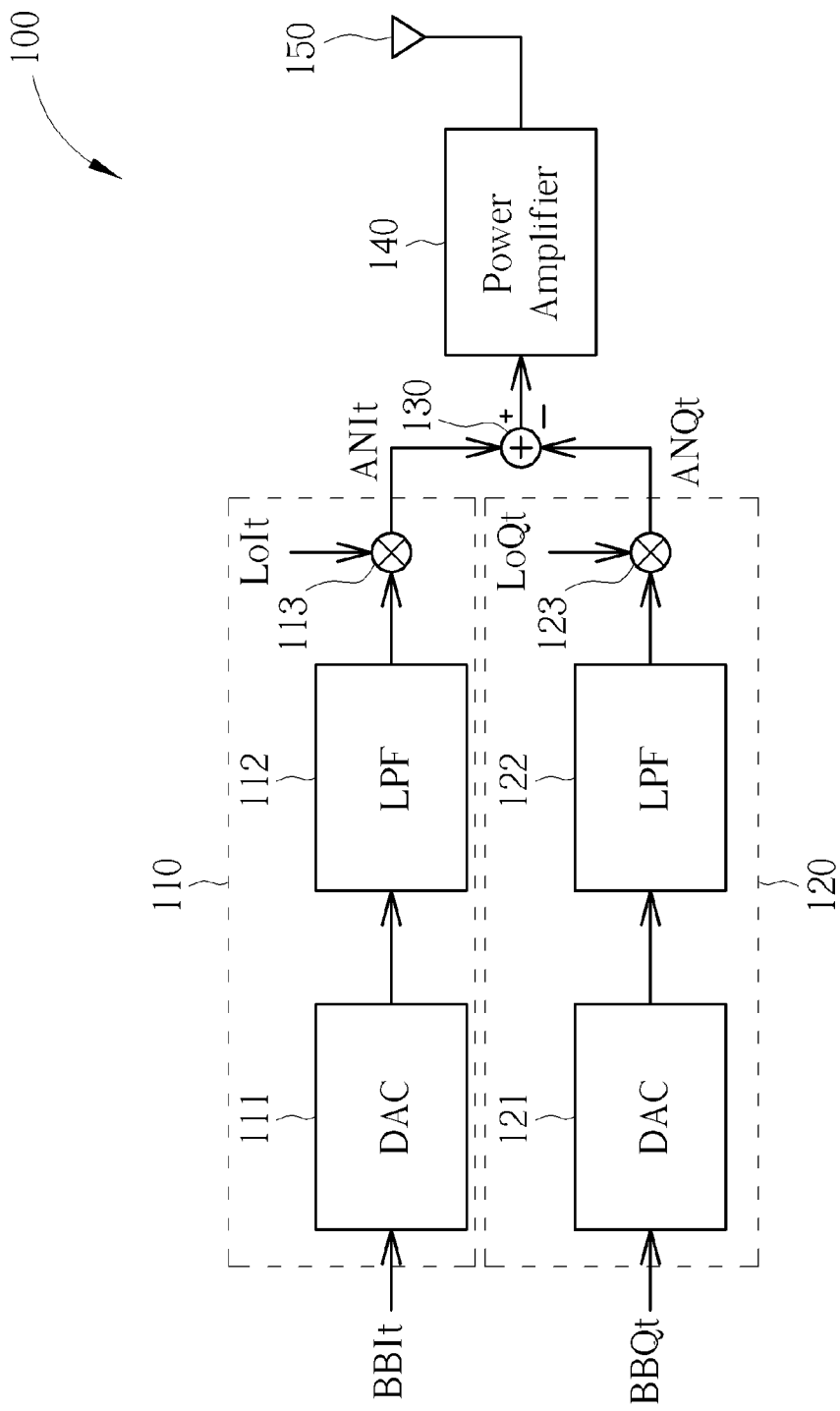
FIG. 1 illustrates a conventional direct-up conversion transmitter.

Please refer to FIG. 1 again. As mentioned above, the DAC 111 and the LFF 112 in the in-phase branch 110, and the DAC 121 and the LPF 122 in the quadrature-phase branch 120 cause different delays to the input signal due to different characteristics of various circuit components therein. Assuming that the baseband in-phase signal BBIt is cos ($\omega_m$t) and the baseband quadrature phase signal BBQt is sin ($\omega_m$t) (where $\omega_m=2\pi f_m$), delay times on different branches will cause the signal generated by LPF 112 and the LPF 114 to become cos ($\omega_m$(t+t0)) and sin ($\omega_m$t), wherein t0 represents relative delay time difference between the I/Q branches. When the time difference t0 is multiplied by the frequency $\omega_m$, there will be a delay time mismatch factor of $\omega_m * t_0$ between the in-phase signal BBIt and the quadrature-phase signal BBQt, which is positively-proportional to the baseband frequency $\omega_m$.

Taking differences between the characteristics of mixers 113 and 123 into consideration, an in-phase local oscillating signal LoIt and a quadrature-phase local oscillating signal LoQt generated by the mixers 113 and 123 can be respectively expressed as (1+g) cos ($\omega_{LO}$ t+$\phi$)) and sin ($\omega_{LO}$ t) (where g and $\phi$ stand for relative amplitude mismatch and relative phase mismatch between I-branch 110 and Q-branch 120). Further, the analog RF signal outputted by the adder 130 of the communication circuit 100 can be expressed as: (1+g)*cos ($\omega_m$ (t+to))*cos ($\omega_{LO}$ t+$\phi$))−sin ($\omega_m$ t)*sin ($\omega_{LO}$ t). Accordingly, the image rejection ratio (IMR) of the communication circuit 100 is $$IMR = \frac{(1+g)^2 + 1 - 2(1+g)\cos(\phi - \theta_m)}{(1+g)^2 + 1 + 2(1+g)\cos(\phi + \theta_m)},$$

where $$\theta_m = \omega_m \cdot to$$

The IMR indicates a ratio of average power of an image signal at frequency ($f_{LO}-f_m$) and average power of a main up-converted signal at frequency ($f_{LO}+f_m$). From the above-mentioned expression, it can be appreciated that mismatch between I/Q branches will affect the IMR of the output of the communication circuit 100. In fact, the lower the IMR is, the better the I/Q branches matches to each other. Therefore, the IMR can be used as an indication of evaluating the matching of the I/Q branches. In addition, the average power of the image signal is related to the gain (i.e., amplitude) and phase mismatches due to differences of the mixers and the local oscillating signals in I/Q branches as well as the delay time mismatch due to differences of the DACs and LPFs in I/Q branches. Hence, the disclosure firstly calibrates the delay time mismatch that is frequency-dependent, and accordingly calibrates the gain and phase mismatches that are frequency-independent.

Figure 2:
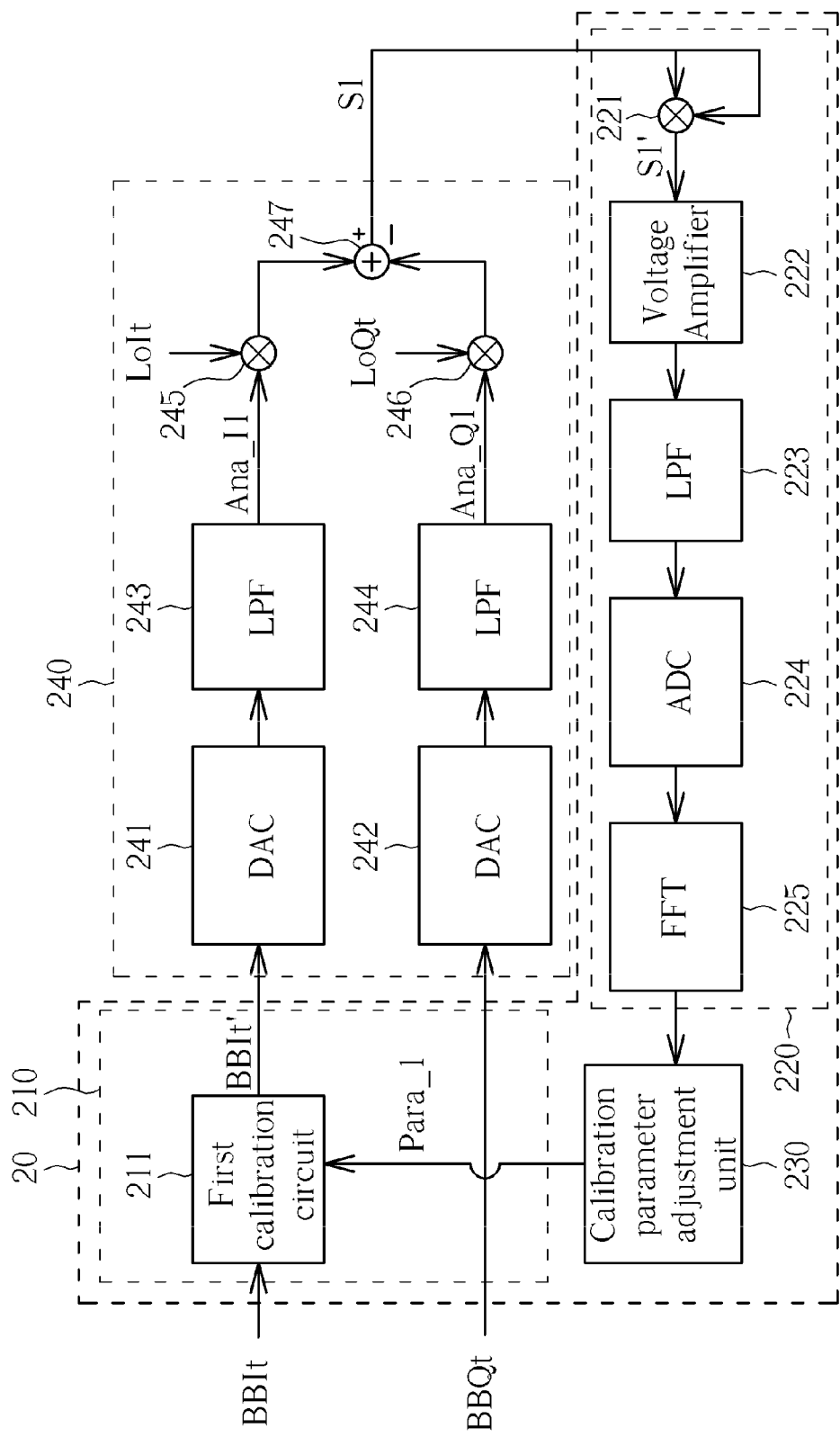
FIG. 2 illustrates a block diagram of an apparatus in an exemplary embodiment.

Please refer to FIG. 2, which illustrates a block diagram of an apparatus in a first exemplary embodiment. The apparatus 20 includes a calibration unit 210, a detection unit 220 and a parameter adjustment unit 230. The apparatus 20 is employed for calibrating a communication circuit 240. The communication circuit 240 includes a I-branch and a Q-branch, which respectively comprise DACs 241 and 242, LPFs 243 and 244, mixers 245 and 246, an adder 247. At the beginning of calibration, the calibration unit 210 receives a baseband in-phase test signal BBIt and a baseband quadrature-phase test signal BBQt, wherein the in-phase test signal BBIt and the quadrature-phase test signal BBQt having components corresponding to a first frequency $f_m$ (e.g., BBIt=cos ($2\pi f_m t$), BBQt=sin ($2\pi f_m t$)). A default value provided by the calibration parameter adjustment 230 will be used as an original value of a current first calibration parameter Para_1 to configure the first calibration circuit 211, which calibrates the in-phase test signal BBIt in advance (for delay time mismatch). It should be noted that I/Q mismatch is relative. Therefore, in various embodiment of the disclosure, the first calibration circuit 211 may perform the calibration on the quadrature-phase test signal to calibrate I/Q mismatch.

Figure 9A:
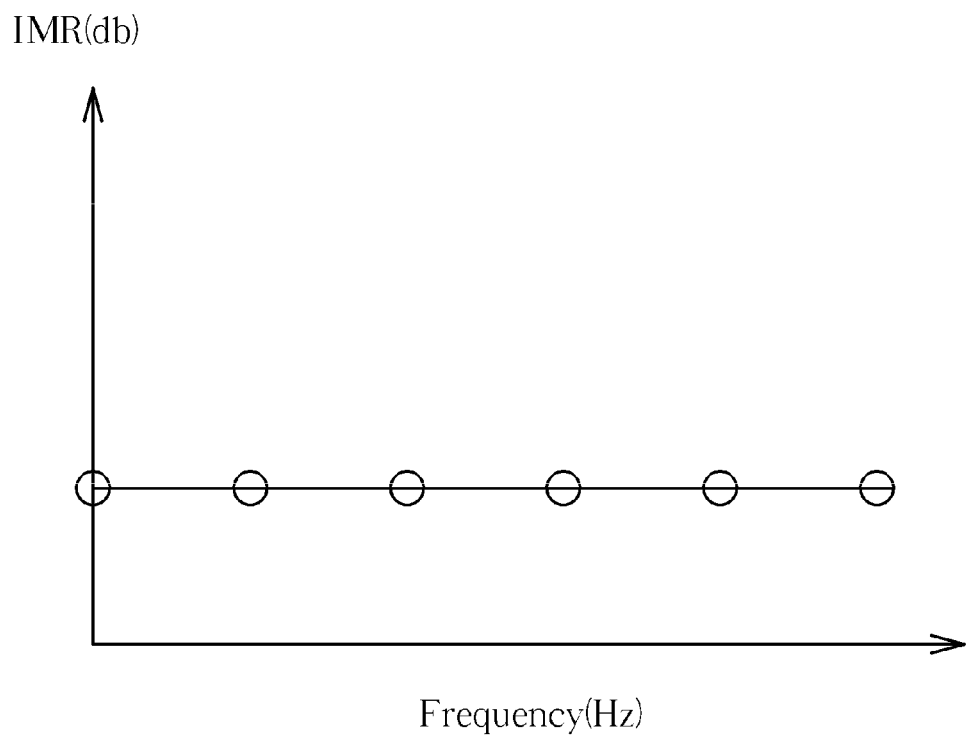
FIG. 9A and FIG. 9B illustrates relationship between the IMR and frequency.
Figure 9B:
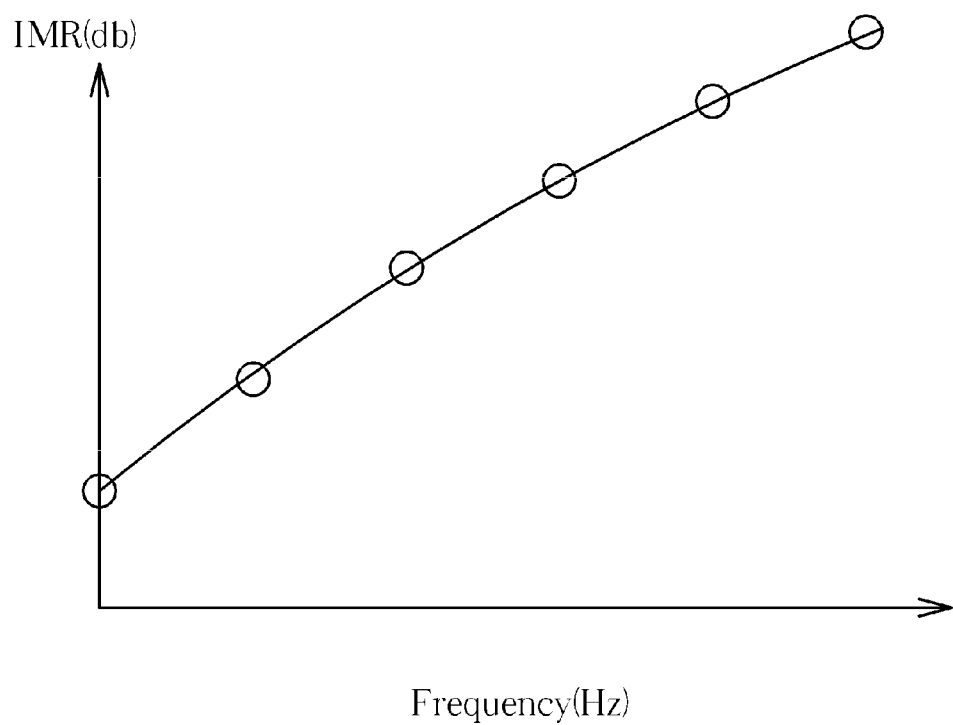

Accordingly, the apparatus 20 of the disclosure performs the following operations repeatedly to adjust the current first calibration parameter Para_1 to obtain a calibration result. A best calibration result causes a relationship between the IMR and frequency shown in FIG. 9B changes (i.e., the IMR is positively proportional to frequency) to that shown in FIG. 9A (i.e., the IMR is independent from frequency). When the first calibration circuit 211 calibrates in-phase test signal BBIt according to the current first calibration parameter, the calibration unit 210 will output the adjusted in-phase test signal BBIt' and the un-adjusted quadrature-phase BBQt to the communication circuit 240. Afterward, the signals are respectively transmitted to the DACs 241 and 242, and LPFs 243 and 244, so as to generate a first in-phase analog signal Ana_I1 and a first quadrature-phase analog signal Ana_Q1. If the current first calibration parameter Para_1 has reached a best value, there will be no delay time mismatch between the first in-phase analog signal Ana_I1 and the quadrature-phase analog signal Ana_Q1. If the delay time mismatch is eliminated, the relationship between the IMR and the frequency will be illustrated in FIG. 9A.

Figure 7:
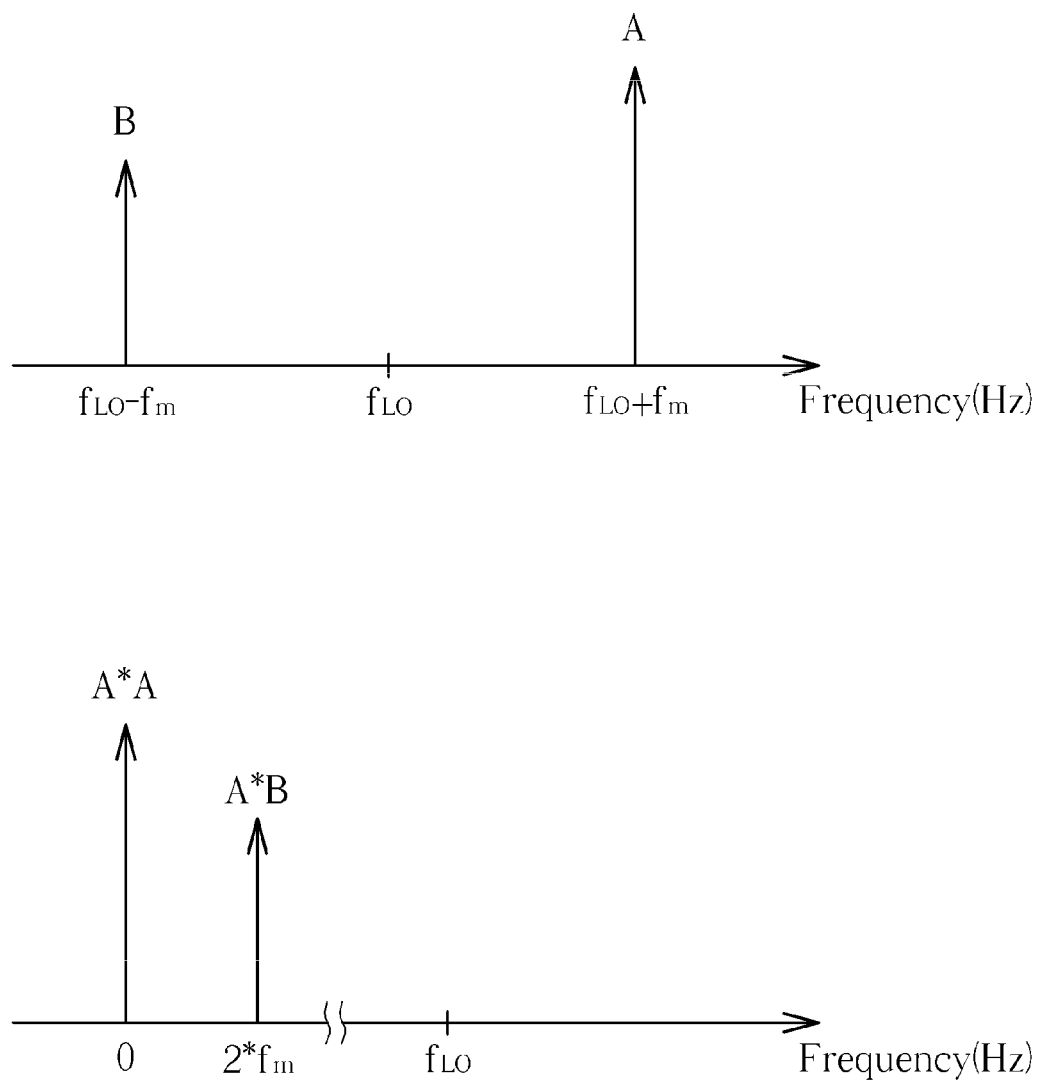
FIG. 7 illustrates a spectrum of a specific signal.

The in-phase analog signal Ana_I1 and the first quadrature-phase analog signal Ana_Q1 are sent to the mixers 245 and 246 respectively. Accordingly, the in-phase analog signal Ana_I1 and the first quadrature-phase analog signal Ana_Q1 are mixed with an in-phase local oscillating signal LoIt, and a quadrature-phase local oscillating signal LoQt, respectively. By the adder 247, a first summation signal S1 is generated by summing up results of mixing. The main purpose of the detection unit 220 is to detect power of an image component of the first summation signal S1 outputted by the communication circuit 240 (In fact, it detects the power of the image component at the frequency that is a double baseband frequency). Therefore, the detection unit 220 observes the spectrum of a self-mixed output of the communication circuit 240. Please refer to the upper part of FIG. 7. Theoretically, the image component B in the spectrum of the first summation signal S1 outputted by the communication circuit 240 has the frequency of ($f_{Lo}-f_m$). Therefore, the detection unit 220 should detect the power at frequency ($f_{Lo}-f_m$). If the power is low, it stands for that I/Q mismatch has been calibrated well. However, frequency ($f_{Lo}-f_m$) is quite close to frequency $f_{Lo}$, which is too high for the detection unit 220 to calculate the power. To overcome such difficulty, the detection unit 220 will perform a self-mixing operation (which multiplies a signal by itself) on the first summation signal S1 by the mixer 221 to generate a first to-be-tested S1', wherein the spectrum of the first to-be-tested S1' is illustrated in the lower part of FIG. 7. Due to self-mixing operation, a spectrum component A*B will be generated at frequency $2f_m$, wherein A stands for the spectrum component at the main up-converted frequency ($f_{LO}+f_m$), and B stands for the spectrum component at the image frequency ($f_{LO}-f_m$). If the value of A is unit, the spectrum component at frequency $2f_m$ is substantially equal to the amount of the spectrum component at the frequency of the image component. Since frequency $2f_m$ is comparatively lower than the frequency ($f_{Lo}-f_m$) ($f_m$ is a baseband frequency, $f_{Lo}$ is a radio frequency), it is easier to calculate the value of the power at frequency $2f_m$. Therefore, the disclosure observes changing of the power of the first to-be-tested S1' at frequency $2f_m$, to adjust the current first calibration parameter Para_1.

To calculate the value of the first power, the detection unit 220 amplifies the first to-be-tested S1' by the variable gain amplifier 222 and then inputs it to the LPF 223, which removes high-frequency components of the first to-be-tested S1', and keeps the medium and low frequency components (e.g. components corresponding to frequency $2f_m$) of the first to-be-tested S1'. By an analog-to-digital converter (ADC) 224 and a fast Fourier transformation unit (FFT) 225, the value of the first power can be calculated. The calibration parameter adjustment unit 230 receives the value of the first power calculated by the detection unit 220, and performs a first calibration parameter adjustment operation according to the value of the first power. In each operation, the calibration parameter adjustment unit 230 updates the current first calibration parameter. As long as a first specific condition is met, the first calibration parameter adjustment operation will be stopped; otherwise, the first calibration parameter adjustment operation will be repeated.

The specific condition may correspond to the number of times that the first calibration parameter adjustment operation is performed or correspond to the value of the first power. For example, if the first calibration parameter adjustment operation is repeatedly performed a lot of times, it is possible that a reasonable and satisfied calibration result has been obtained. Hence, the calibration parameter adjustment unit 230 stops performing the first calibration parameter adjustment operation. Alternatively, if the value of the first power is smaller than a predetermined value, meaning that the frequency-dependent mismatch between I/Q branches is well calibrated, the calibration parameter adjustment unit 230 will therefore stop performing the first calibration parameter adjustment operation. If none of these conditions is met, the calibration parameter adjustment unit 230 will repeat the first calibration parameter adjustment operation until I/Q mismatch is well calibrated.

Figure 4:
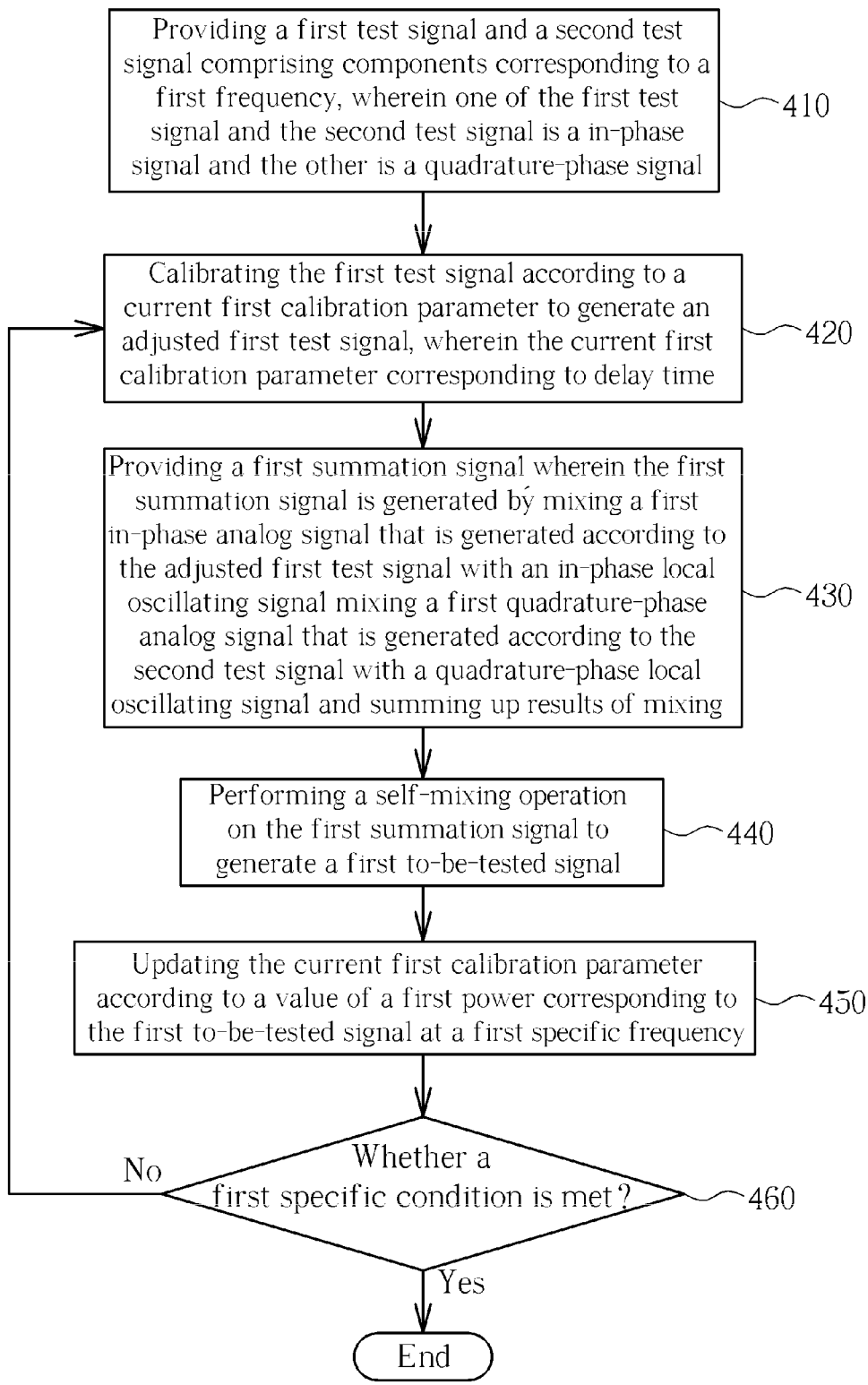
FIG. 4 illustrates a flow chart of a method in an exemplary embodiment.

A flow chart of operations of the apparatus of the disclosure is illustrated in FIG. 4, which includes:

Step 410: providing a first test signal and a second test signal comprising components corresponding to a first frequency, wherein one of the first test signal and the second test signal is a in-phase signal and the other is a quadrature-phase signal;

Step 420: calibrating the first test signal according to a current first calibration parameter to generate an adjusted first test signal, wherein the current first calibration parameter corresponding to delay time;

Step 430: providing a first summation signal; wherein the first summation signal is generated by: mixing a first in-phase analog signal (Ana_I1) that is generated according to the adjusted first test signal with an in-phase local oscillating signal LoIt; mixing a first quadrature-phase analog signal (Ana_Q1) that is generated according to the second test signal with a quadrature-phase local oscillating signal (LoQt); and summing up results of mixing;

Step 440: performing a self-mixing operation on the first summation signal (S1) to generate a first to-be-tested signal (S1');

Step 450: updating the current first calibration parameter according to a value of a first power corresponding to the first to-be-tested signal at a first specific frequency (e.g. double baseband frequency);

Step 460: determining if a first specific condition is met

In Step 460, it is determined whether the first specific condition is met. If not, the flow goes back to Step 420, where the first test signal will be adjusted again according to the updated current first calibration parameter, and the value of the first power will be calculated again, until the first specific condition is met.

Figure 5:
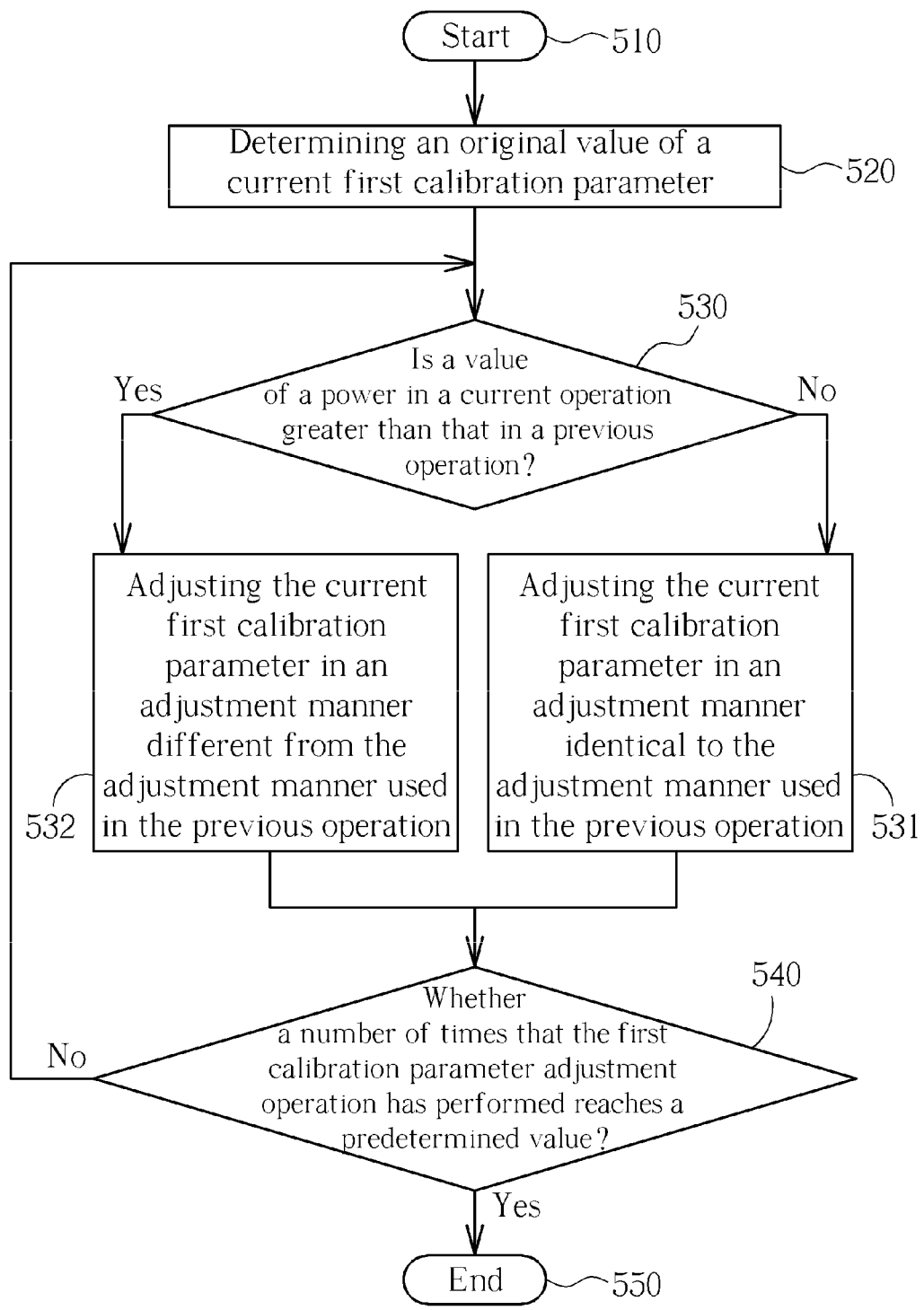
FIG. 5 illustrates a flow chart regarding adjusting the current first calibration parameter according to the value of the first power in an exemplary embodiment.

Furthermore, the method of adjusting the first calibration parameter is illustrated in a flow chart shown in FIG. 5. in step 510, the flow starts. In step 520, a default value provided by the calibration parameter adjustment unit 230 is utilized to configure the first calibration parameter Para_1. The calibration unit 210 accordingly adjusts one of the test signals BBIt and BBQt to generate an adjusted test signal. With the detection unit 220, a value of a first power of the first to-be-tested S1' at a frequency that is twice as high as the baseband frequency. In Step 530, it is detected that whether the value of the first power in the current first calibration parameter adjustment operation is greater than that in the previous first calibration parameter adjustment operation. According to the detection result, one of a first adjustment manner and a second adjustment manner is selected. If the value of the first power in the current operation is greater than that in the previous operation, the flow goes to Step 532; otherwise, it goes to Step 531. If the flow goes to Step 532, it means that the current first calibration parameter generated in the current first calibration parameter adjustment operation cannot effectively eliminate the delay time mismatch. Hence, the adjustment manner for adjusting the current first calibration parameter requires to be changed. For example, if in a previous first calibration parameter adjustment operation, the first calibration parameter is decreased (e.g. the second adjustment manner), it is required to increase current first calibration parameter in the current first calibration parameter adjustment operation (e.g. first adjustment manner), and vice versa. If the flow goes to Step 531, it represents that the current first calibration parameter generated in the current first calibration parameter adjustment operation indeed reduce the delay time mismatch. Hence, it is unnecessary to change the adjustment manner being used for the current first calibration parameter. For example, if in a previous first calibration parameter adjustment operation, the current first calibration parameter is decreased, the disclosure will still decrease the current first calibration parameter in the current operation. In short, if the flow goes to Step 532, a different adjustment manner will be selected. If the flow goes to Step, the same adjustment manner will be selected.

It should be noted that the adjustment value to adjust the current first calibration parameter in each first calibration parameter adjustment operation is not limited. For example, in one embodiment, to speed up the calibration process, a larger adjustment value is used at the beginning (rough tuning). After a period of time, a smaller adjustment value will be used (fine tuning). Alternatively, in one embodiment, the adjustment value for increasing the current first calibration parameter may be different from that is used for decreasing the current first calibration parameter.

Figure 8:
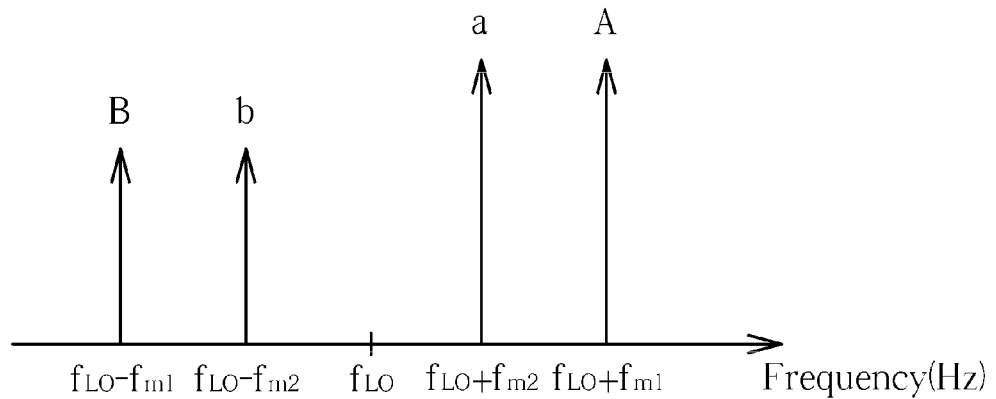
FIG. 8 illustrates a spectrum of another specific signal.
Figure 8:
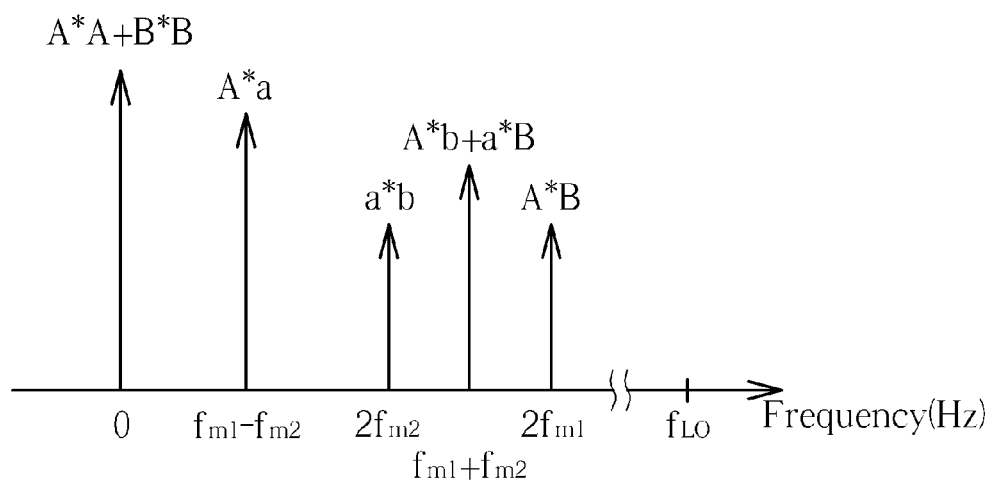

In another exemplary embodiment, in order to calibrate the mismatches that are frequency-dependent and frequency-independent, and applying the calibration method to a wideband system, there will be additional components corresponding to a second frequency in the test signal. By doing so, the detection unit 220 can detect the power at different frequencies to eliminate all the mismatches between I/Q branches. In this embodiment, the in-phase test signal BBIt is expressed as $\cos(\omega_{m1}t)+\cos(\omega_{m2}t)$ while the quadrature-phase test signal BBQt is expressed as $\sin(\omega_{m1}t)+\sin(\omega_{m2}t)$. That is, in-phase test signal BBIt has a component $\cos(\omega_{m1}t)$ corresponding to a first frequency $\omega_{m1}$ and a component $\cos(\omega_{m2}t)$ corresponding to a second frequency $\omega_{m2}$. Also, quadrature-phase test signal BBQt has components corresponding to these two frequencies $\omega_{m1}$ and $\omega_{m2}$. As a result, a second summation signal S2 outputted by the adder 247 of the communication circuit 240 will be $(1+g)*\cos(\omega_{LO}t+\phi)*[\cos(\omega_{m1}t+\omega_{m1}t_0)+\cos(\omega_{m2}t+\omega_{m2}t_0)]*\sin(\omega_{LO}t)*[\sin(\omega_{m1}t+\sin(\omega_{m2}t)]$. In order to calibrate such mismatch, it is required to observe the value of the power of the signal spectrum at double frequency, such as, $2*f_{m1}$ or $2*f_{m2}$ and accordingly generate the first calibration parameter Para_1 for the delay time mismatch. Accordingly, the value of the power at the signal spectrum at frequency $(f_{m1}+f_{m2})$ will be observed to adjust a second calibration parameter and a third calibration parameter (corresponding to amplitude mismatch and phase mismatch due to mixers and local oscillating signals between I/Q branches). Please refer to FIG. 8. The upper part of FIG. 8 is a spectrum of the second summation signal S2. To determine whether the mismatch is well calibrated, it is required to observe the power of the image components B and b corresponding to the two test signal. As mentioned above, since the image components have quite high frequencies, it is difficult to calculate the corresponding power. With the self-mixing operation, a second to-be-tested signal S2' which comprises component corresponding to image frequency is used for observation. When calibrating the delay time mismatch, the power of the image component A*B or a*b at double frequencies $(2\pi f_{m1}$ or $2\pi f_{m2})$ is observed. When calibrating the amplitude and phase mismatches, the power of the image component $(A*b+a*B)$ at frequency $(f_{m1}+f_{m2})$ is observed.

Figure 3:
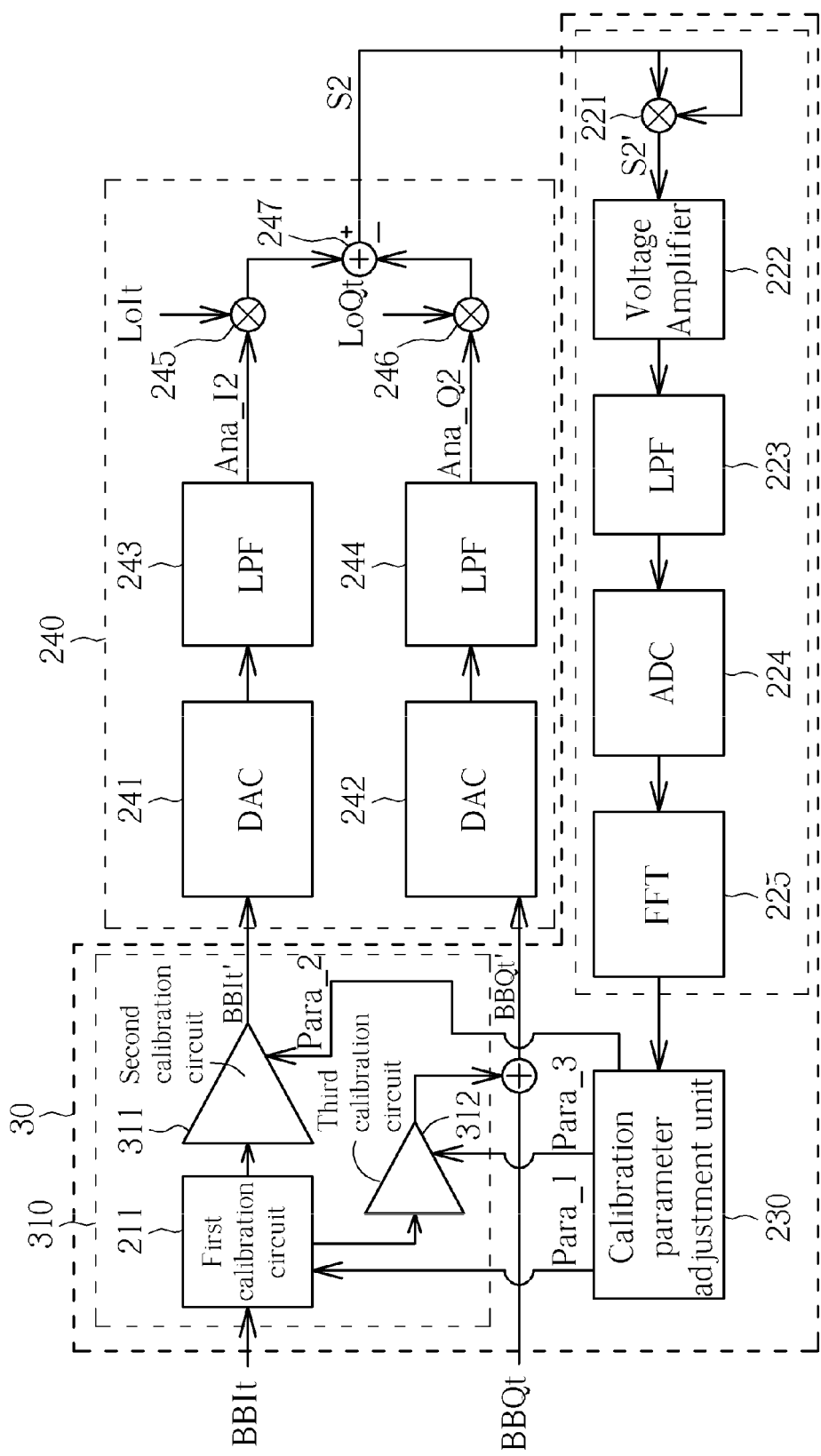
FIG. 3 illustrates a block diagram of an apparatus in an exemplary embodiment.

FIG. 3 illustrates an apparatus corresponding to the embodiment mentioned above. The calibration unit 310 includes a second calibration circuit 311 and a third calibration circuit 312, which respectively calibrates the amplitude mismatch and the phase mismatch between I/Q branches. The calibrations depend on a current second calibration parameter Para_2 (corresponds to amplitude mismatch) and a current third calibration parameter Para_3 (corresponds to phase mismatch). It should be noted that the amplitude and phase mismatches between I/Q branches are relative. Hence, in various embodiments of the disclosure, it is possible to use the second and the third calibration circuits to calibrate the quadrature-phase test signal BBQt for achieving the amplitude and phase balances between the I/Q branches.

At first, the calibration unit 310 utilizes the first calibration circuit 211 to calibrate the delay time mismatch that is frequency-dependent. When the first specific condition is met, the calibration parameter adjustment unit 230 will not adjust the current first calibration parameter Para_1. Instead, the calibration unit 310 starts to calibrate the phase mismatch and the amplitude mismatch. The in-phase test signal BBIt will be adjusted by the first calibration circuit 211 and the second calibration circuit 311 to generate an adjusted in-phase test signal BBIt'. In addition, the in-phase test signal BBIt will be adjusted by the third calibration circuit 312, and added to the quadrature-phase test signal BBQ to generate an adjusted quadrature-phase test signal BBQt'. The adjusted signals BBIt' and BBQt' will be processed by the LPFs 232 and 234 to generate a second in-phase analog signal Ana_I2 and a second quadrature-phase analog signal Ana_Q2. With mixers 245 and 246, and the adder 247m a second summation signal S2 can be generated. The detection unit 220 performs a self-mixing operation on the second summation signal S2 to generate a second to-be-tested signal S2'. The detection unit 220 calculates a value of a second power according to the spectrum component of the to-be-tested signal S2' at frequency $(f_{m1}+f_{m2})$. The calibration parameter adjustment unit 230 performs a second and third calibration parameter adjustment operation, which updates the current second calibration parameter Para_2 and the current third calibration parameter Para_3 depending the value of the second power in every operation.

Figure 6:
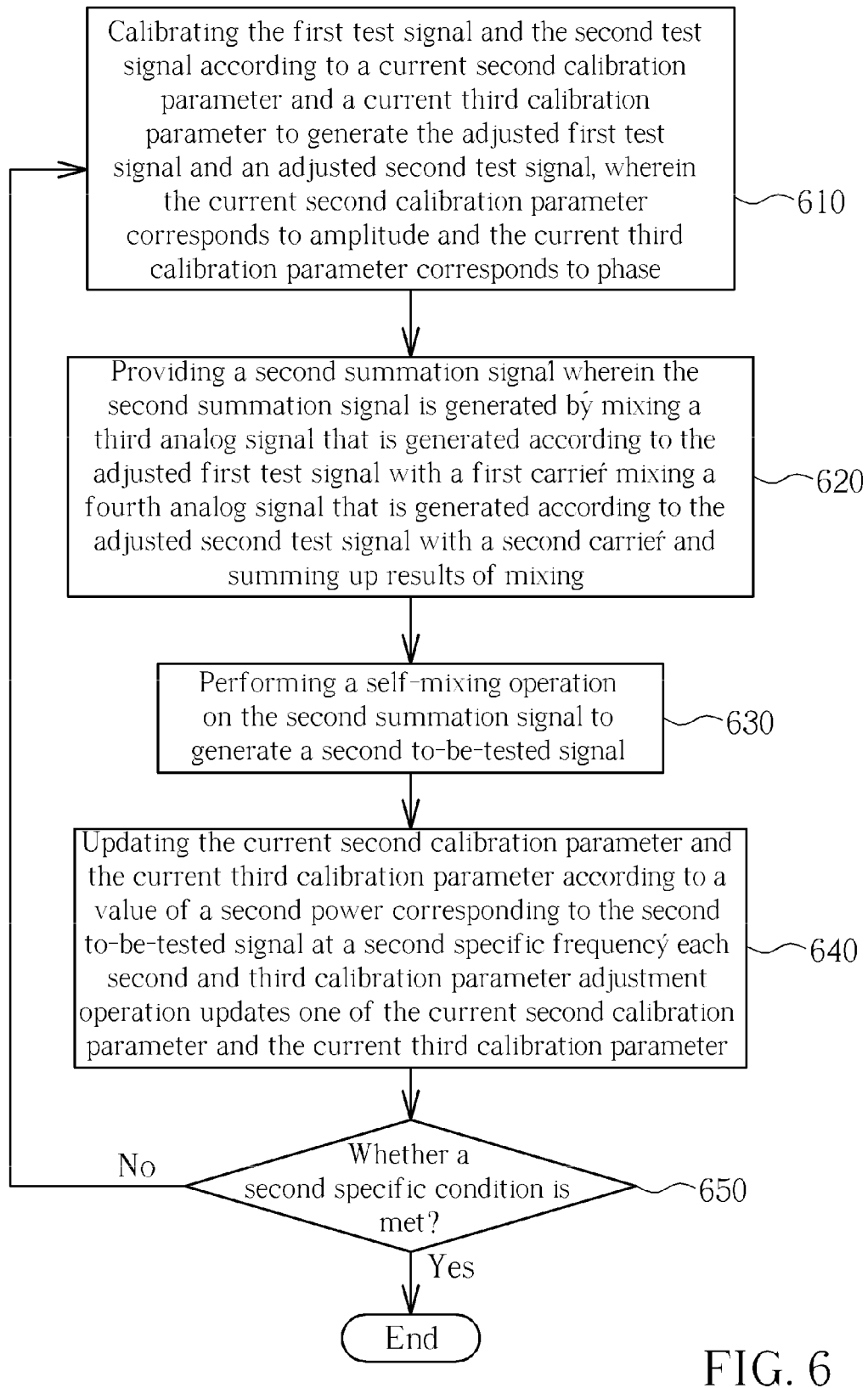
FIG. 6 illustrates a flow chart of a method in an exemplary embodiment.

In each second and third calibration parameter adjustment operation, the calibration parameter adjustment unit 230 updates one of the current second calibration parameter Para_2 and the current third calibration parameter Para_3. In other words, the calibration parameter adjustment unit 230 alternately updates the current second calibration parameter Para_2 and the current third calibration parameter Para_3. When a second specific condition is met, the calibration parameter adjustment unit 230 stops the second and third calibration parameter adjustment operation; otherwise, the calibration parameter adjustment unit 230 repeats the second and third calibration parameter adjustment operation. The second specific condition is related to the number of times that the second and third calibration parameter adjustment operation is repeated or the value of the second power. A flow chart based on this embodiment is illustrated in FIG. 6. As principles and operations regarding each step therein are similar to those in FIG. 4, detailed descriptions are omitted here for the sake of brevity.

In conclusion, the disclosure generates test signals having components corresponding to several frequencies, and evaluates how the mismatches affect the output signal of the communication circuit. By repeatedly adjusting the calibration parameter and observing changes of the power of the image signal at the double baseband frequency and the power simultaneously, a best calibration parameter can be therefore found to eliminate I/Q mismatch that are frequency-dependent and frequency-independent in the communication circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of calibrating in-phase and quadrature-phase mismatch (I/Q mismatch) between an in-phase signal and a quadrature-phase signal of a communication circuit, comprising:
   providing a first test signal and a second test signal having components corresponding to a first frequency, wherein one of the first and the second test signals is an in-phase signal and the other is a quadrature-phase signal;
   calibrating the first test signal according to a current first calibration parameter to generate an adjusted first test signal, wherein the current first calibration parameter corresponds to delay time; and
   performing a first calibration parameter adjustment operation:
      providing a first summation signal, wherein the first summation signal is generated by: mixing a first in-phase analog signal that is generated according to the adjusted first test signal with an in-phase local oscillating signal; mixing a first quadrature-phase analog signal that is generated according to the second test signal with a quadrature-phase local oscillating signal; and summing up results of mixing; and
      performing a self-mixing operation on the first summation signal to generate a first to-be-tested signal; and updating the current first calibration parameter according to a value of the first power corresponding to the first to-be-tested signal at a first specific frequency;
   when a first specific condition is met, stopping the first calibration parameter adjustment operation; otherwise, repeating the first calibration parameter adjustment operation until the first specific condition is met.

2. The method of claim 1, wherein the step of updating the current first calibration parameter comprises:
   selecting one of a first adjustment manner and a second adjustment manner to adjust the current first calibration parameter.

3. The method of claim 2, wherein the first adjustment manner comprises adding a first adjustment parameter to the current first calibration parameter, and the second adjustment manner comprises subtracting a second adjustment parameter from the current first calibration parameter.

4. The method of claim 3, wherein the first adjustment parameter is not the same in different first calibration parameter adjustment operations and the second adjustment parameter is not the same in different first calibration parameter adjustment operations.

5. The method of claim 2, wherein the step of selecting one of the first adjustment manner and the second adjustment manner to adjust the current first calibration parameter comprises:
   if the value of the first power at the time a current first calibration parameter adjustment operation is performed is not greater than the value of the first power at the time a previous first calibration parameter adjustment operation is performed, updating the current first calibration parameter in an adjustment manner that is identical to the adjustment manner that used in the previous first calibration parameter adjustment operation; and
   if the value of the first power at the time the current first calibration parameter adjustment operation is performed is greater than the value of the first power at the time the previous first calibration parameter adjustment operation is performed, updating the current first calibration parameter in an adjustment manner that is different from the adjustment manner used in the previous first calibration parameter adjustment operation.

6. The method of claim 1, wherein the first specific condition is met if a number of times that the first calibration parameter adjustment operation is repeated has reached a predetermined value.

7. The method of claim 1, wherein the first specific condition is met if the value of the first power in a current first calibration parameter adjustment operation is smaller than a predetermined value.

8. The method of claim 1, wherein the first specific frequency is twice as high as the first frequency.

9. The method of claim 1, wherein the first and the second test signals respectively comprise components corresponding to a second frequency, wherein the second frequency is different from the first frequency.

10. The method of claim 9, further comprising:
   calibrating the first test signal according to a current second calibration parameter and a current third calibration parameter to generate the adjusted first test signal and an adjusted second test signal, wherein the current second calibration parameter corresponds to amplitude, and the current third calibration parameter corresponds to phase; and performing a second and third calibration parameter adjustment operation:

providing a second summation signal, wherein the second summation signal is generated by: mixing the in-phase local oscillating signal with a second in-phase analog signal that is generated according to the adjusted first test signal; mixing the quadrature-phase local oscillating signal with a second quadrature-phase analog signal that is generated according to the adjusted second test signal; and summing up results of mixing;

performing a self-mixing operation on the second summation signal to generate a second to-be-tested signal; and updating the current second calibration parameter and the current third calibration parameter according to a value of the second power corresponding to the second to-be-tested signal at a second specific frequency, wherein each of the second and third calibration parameter adjustment operations updates one of the current second calibration parameter and the current third calibration parameter;

when a second specific condition is met, stopping the second and third calibration parameter adjustment operation; otherwise, repeating the second and third calibration parameter adjustment operation.

11. The method of claim 10, wherein the second specific frequency is equal to a sum of the first frequency and the second frequency.

12. An apparatus of calibrating I/Q mismatch in a communication circuit, for providing a first test signal and a second test signal having components corresponding to a first frequency to the communication circuit, wherein one of the first test signal and the second test signal is an in-phase signal and the other is a quadrature-phase signal, the apparatus comprising:

a calibration unit, for respectively receiving the first test signal and the second test signal, and calibrating the first test signal according to a current first calibration parameter to generate an adjusted first test signal, wherein the current first calibration parameter corresponds to delay time;

a detection unit, for performing a self-mixing operation on a first summation signal to generate a first to-be-tested signal, and calculating a value of a first power corresponding to the first to-be-tested signal at a first specific frequency, wherein the communication circuit generates a first in-phase analog signal according to the adjusted first test signal, and generates a first quadrature-phase analog signal according to the second test signal, a mixer mixes the first in-phase analog signal with an in-phase local oscillating signal, and mixes the first quadrature-phase analog signal according to the second test signal with a quadrature-phase local oscillating signal, and an adder sums up results of mixing to generate the first summation signal; and a calibration parameter adjustment unit, coupled to the calibration unit and the detection unit, for performing a first calibration parameter adjustment operation to update the current first calibration parameter according to the value of the first power, wherein the calibration parameter adjustment unit stops the first calibration parameter adjustment operation when a first specific condition is met; otherwise, the calibration parameter adjustment unit repeats the first calibration parameter adjustment operation.

13. The apparatus of claim 12, the calibration parameter adjustment unit selects one of a first adjustment manner and a second adjustment manner to adjust the current first calibration parameter.

14. The apparatus of claim 13, wherein when the calibration parameter adjustment unit selects the first adjustment manner, the calibration parameter adjustment unit adds a first adjustment parameter to the current first calibration parameter, and when the calibration parameter adjustment unit selects the second adjustment manner, the calibration parameter adjustment unit subtracts a second adjustment parameter from the current first calibration parameter.

15. The apparatus of claim 14, wherein the first adjustment parameter becomes different in different first calibration parameter adjustment operations and the second adjustment parameter becomes different in different first calibration parameter adjustment operations.

16. The apparatus of claim 13, wherein:

if the value of the first power at the time the calibration parameter adjustment unit performs a current first calibration parameter adjustment operation is not greater than the value of the first power at the time the calibration parameter adjustment unit performs a previous first calibration parameter adjustment operation, the calibration parameter adjustment unit updates the current first calibration parameter in an adjustment manner that is identical to the adjustment manner used in the previous first calibration parameter adjustment operation; and if the value of the first power at the time the calibration parameter adjustment unit performs the current first calibration parameter adjustment operation is greater than the value of the first power at the time the calibration parameter adjustment unit performs the previous first calibration parameter adjustment operation, the calibration parameter adjustment unit updates the current first calibration parameter in an adjustment manner that is different from the adjustment manner used in the previous first calibration parameter adjustment operation.

17. The apparatus of claim 12, wherein if a number of times that the calibration parameter adjustment unit repeats the first calibration parameter adjustment operation has reached a predetermined value, the calibration parameter adjustment unit determines the first specific condition is met.

18. The apparatus of claim 12, wherein when the value of the first power in a current first calibration parameter adjustment operation is smaller than a predetermined value, the calibration parameter adjustment unit determines the first specific condition is met.

19. The apparatus of claim 12, wherein the first specific frequency is twice as high as the first frequency.

20. The apparatus of claim 12, wherein the first and the second test signals respectively comprise components corresponding to a second frequency, wherein the second frequency is different from the first frequency.

21. The apparatus of claim 20, wherein the calibration unit further calibrates the first test signal according to a current second calibration parameter and a current third calibration parameter to generate the adjusted first test signal and an adjusted second test signal, wherein the current second calibration parameter corresponds to amplitude and the current third calibration parameter corresponds to phase; the communication circuit generates a second in-phase analog signal and a second quadrature-phase analog signal according to the adjusted first test signal and the adjusted second test signal;

the mixer mixes the in-phase analog signal and the second quadrature-phase analog signal with a in-phase local oscillating signal and a quadrature-phase local oscillating signal, respectively; the adder sums up results of mixing to generate a second summation signal; the detection unit performs a self-mixing operation on the second summation signal to generate a second to-be-tested signal, and calculate a value of a second power corresponding to the second to-be-tested signal at a second specific frequency; the calibration parameter adjustment unit performs a second and third calibration parameter adjustment operation according to the value of the second power to update the current second calibration parameter and the current third calibration parameter, wherein in each the second and third calibration parameter adjustment operation, the calibration parameter adjustment unit updates one of the current second calibration parameter and the current third calibration parameter; and when a second specific condition is met, the calibration parameter adjustment unit stop performing the second and third calibration parameter adjustment operation; otherwise, the calibration parameter adjustment unit repeats the second and third calibration parameter adjustment operation.

22. The apparatus of claim 20, wherein the second specific frequency is equal to a sum of the first frequency and the second frequency.

* * * * *